United States Patent [19]

Williams et al.

[11] 4,185,713
[45] Jan. 29, 1980

[54] HYDROSTATIC DRIVE SYSTEM

[75] Inventors: Rodney B. Williams, Higley, Ariz.; Jerry A. Taylor, Dixon, Calif.

[73] Assignee: Dixon "Y" Machine, Incorporated, Dixon, Calif.

[21] Appl. No.: 877,441

[22] Filed: Feb. 13, 1978

Related U.S. Application Data

[63] Continuation of Ser. No. 693,461, Jun. 7, 1976, abandoned.

[51] Int. Cl.² .............................................. B60K 17/34
[52] U.S. Cl. .................................... 180/242; 180/307; 180/308
[58] Field of Search ................... 180/66 R, 6.48, 44 F; 60/484

[56] References Cited

U.S. PATENT DOCUMENTS

| | | | |
|---|---|---|---|
| 2,330,565 | 9/1943 | Eckart | 180/66 R X |
| 2,361,098 | 10/1944 | Higby | 180/66 R X |
| 3,154,164 | 10/1964 | Shaw et al. | 180/66 R X |
| 3,161,246 | 12/1964 | Meeker et al. | 180/66 R X |
| 3,272,279 | 9/1966 | Budzich | 180/66 R X |
| 3,969,950 | 7/1976 | Rau et al. | 180/66 F X |

FOREIGN PATENT DOCUMENTS

1258284  4/1968  Fed. Rep. of Germany ........ 180/66 R

*Primary Examiner*—Joseph F. Peters, Jr.
*Assistant Examiner*—Milton L. Smith
*Attorney, Agent, or Firm*—L. J. Pizzanelli; John F. Verhoeven; C. E. Tripp

[57] ABSTRACT

A hydrostatic drive system for a four wheel drive vehicle such as a field harvesting machine which must accurately track the planting rows, includes an engine, a pump and individual hydraulic wheel motors connected to the pump and coupled to the wheels through a manually set free wheeling clutch. The motors are in series connection at each side of the vehicle, with the pairs of series connected motors on opposite sides of the vehicle in parallel connection with the pump. When the traction of a wheel on one side is reduced or lost, both wheels on that side continue to rotate at the same speed. Under these conditions, the driving wheel motor on the aforesaid side of the vehicle will provide increased torque output to compensate for the reduced driving power of the slipping wheel. For road travel between harvesting fields, the wheels on the right side of the vehicle are mechanically declutched from their respective motors, and valves are closed to close off the hydraulic lines to the right side motors which routes all of the hydraulic fluid from the pump to the motors on the left side of the vehicle, and hence the ground speed of the vehicle in two wheel drive is approximately double the harvesting speed in four wheel drive for a given output of the hydraulic pump which drives the motors.

1 Claim, 6 Drawing Figures

FIG_5

FIG_6

HYDROSTATIC DRIVE SYSTEM

This is a continuation, of application Ser. No. 693,461 filed June 7, 1976 and now abandoned.

CROSS REFERENCE TO RELATED APPLICATIONS

The present application is directed to the hydraulic drive system of an agricultural machine. The application discloses a root crop harvesting machine, the picking heads and associated harvesting means of which are disclosed and claimed in our copending patent application Ser. No. 790,355 filed on Apr. 25, 1977.

BACKGROUND OF THE INVENTION

1. Field of the Invention

The present invention concerns self-propelled four wheel drive agricultural machines of the type having hydraulic propulsion motors for each wheel.

2. Description of the Prior Art

In the prior art, harvesting machines of various types have employed hydraulic wheel motors, primarily because of the superior reliability they afford over mechanical drive systems in loose soil, sand or mud, and under other adverse conditions. In conventional hydraulic drive systems wherein individual wheel motors are used to power each of four support wheels, it is usually the case that the motors are in parallel connection across the supply and return lines from the hydraulic pump. As long as all wheels maintain about equal traction, the driving torque applied to the wheels is substantially the same. However, if one wheel loses traction and slips on the ground, the parallel hydraulic connections to the motors cause the slipping wheel to accelerate because the pressurized hydraulic fluid to the wheel motors follows the path of least resistance. Accordingly, the other motors receive less fluid and the torque to their respective wheels is reduced. When the vehicle regains full traction with all wheels, the wheel which was accelerated retains traction while turning more rapidly than the other wheels. This can cause the vehicle to yaw, or deviate from the desired steering direction. If a wheel completely loses traction it spins rapidly and none of the other motors will drive the vehicle. The spinning wheel must either be chocked or the vehicle may have to be towed to a location where all wheels have traction.

In the same type of vehicle having parallel hydraulic connections to the motors, it is usually the case that either the front pair of wheel motors or the rear pair of wheel motors are both hydraulically cut out of the circuit and mechanically uncoupled from the wheels for road travel. Thus, either the front pair of wheels or the rear pair of wheels are used for road travel as between harvesting fields. With the same volume of fluid used for energizing the motors for road travel as is used in the usual harvesting operation, the vehicle speed approximately doubles. However, if one of the two drive wheels now loses traction, the free wheel accelerates and the motor of the traction wheel is either partially or fully starved, and may stall. If one of the drive wheel motors is stalled, due to the other wheel losing traction in a two wheel driving mode, the vehicle cannot be moved at all. Even if the disconnected wheel motors are brought back into use, this may not assure that the vehicle can then be moved, and it will then have to be towed.

A further disadvantage of the type of two wheel road-travel driving system where the motors are in parallel connection is that many harvesting machines are extremely large and are purposely driven along the shoulder of the road so as to keep clear of the road traffic. This often places the right hand driving wheel on a shoulder surface of loose soil or gravel. As a result of the unequal traction between the pavement supported wheel, and the wheel on the shoulder, a condition is established which can adversely affect the driving capabilities of the two driving wheels in the same manner above described. On an ascending grade or a descending grade, an even more potentially dangerous condition can result. If the vehicle is traveling uphill and the shoulder-supported wheel loses traction, that wheel accelerates and can cause the wheel supported on the pavement to stall. Thus, in the absence of mechanical brakes, the vehicle cannot be stopped, and even when moving, the vehicle is difficult to steer. Even slight grades may be hazardous with a harvesting machine which weighs several tons, as many machines do.

Another drawback of four wheel drive harvesting machines employing hydraulic motors in parallel connection is that in field harvesting operations an unequal loss of traction for a wheel on each side of the vehicle can result in unequal driving force for the wheels which still have full traction. While this condition can be hydraulically compensated, such compensation is not precise. For example, (assuming a constant flow of fluid from the main pump, and fixed displacement wheel motors) parallel-connection hydraulic motors in a four wheel drive system may each be provided with a flow control system to limit the flow to a tractionless wheel and thus reduce the deceleration of the wheels having full traction. However, each flow control system must necessarily be set at a higher flow volume than the motor normally requires in full traction operation. As a result, a wheel losing traction will still draw more than its normal supply of fluid, and will thereby starve fluid from the other motors, and they will correspondingly decelerate. This causes unequal driving force to the driving wheels, and though the effect is diminished by a flow control system, it is not totally eliminated. Moreover, if the vehicle is provided with a reversible main pump for obtaining reverse directional movement of the vehicle, and for braking, a flow control valve must be used at each side of every motor.

The above discussed disadvantages of the conventional drive system, where the wheel motors are connected in parallel across the pump outlet line and the pump return line, are eliminated by the hydraulic circuit of the present invention, which:

(1) Prevents yawing of the vehicle if a wheel momentarily loses partial traction during four wheel drive in the harvesting field.

(2) Employs only two driving wheels on the paved side of the road for high speed travel on the road.

(3) Prevents acceleration of one wheel on one side of the harvester if that wheel loses traction, and causes the torque exerted by the other wheel motor on the same side of the vehicle to be increased to maintain driving traction.

(4) Provides the action in (3) when one driving wheel slips, either during four wheel drive field travel or during two wheel drive road travel.

(5) Achieves the foregoing improved results by a hydraulic system which is no more complex or costly than the presently employed systems.

SUMMARY OF THE INVENTION

Under the present invention a four wheel drive harvester or other agricultural machine has the two hydraulic wheel motors on one side of the machine connected in series and the hydraulic wheel motors on the other side are also connected in series. The laterally opposed sets of series connected wheel motors are connected in parallel to the hydraulic pump. Under normal operating conditions in the harvesting field at least one wheel on each side of the machine will have traction. If a wheel on one side loses traction, its series connection with the other wheel on the same side which has traction will cause the motor associated with the wheel which has lost traction to continue rotating at the same speed as before, but since the torque output of the slipping wheel motor is reduced, the pressure drop across that motor is correspondingly reduced. Thus, the other motor on the same side of the machine receives fluid at a higher pressure and hence will produce increased torque for the wheel driven thereby. As a result, the loss of driving power from one wheel is compensated for by an increase in the driving power of the other wheel on the same side of the machine, and the wheels will not power steer the machine and cause it to yaw.

A further feature of the present invention is that during road travel the drive motors for the two wheels at the right side of the machine are hydraulically de-energized and the wheels are mechanically de-clutched from their associated motors. Thus, the machine is driven by the two left side driving wheels which are usually riding on a smooth or paved road surface. If one of the driving wheels on the surfaces of which they are usually riding loses traction, the previously described condition of an automatic and corresponding increase in the driving torque available for the other driving wheel occurs because of the series hydraulic connection of the two driving motors on that side of the machine. Thus, during two wheel drive road travel, the machine can never completely lose all motive power unless both driving wheels on the driving side of the vehicle lose traction, an improbable event. There is no need for auxiliary mechanical brakes for individual wheels to overcome power steering, and in fact mechanical brakes can be omitted entirely because so long as one wheel has traction the hydraulic flow can be reduced or reversed to brake the wheel motor or motors which have traction.

DESCRIPTION OF THE PREFERRED EMBODIMENT

Figure 1:
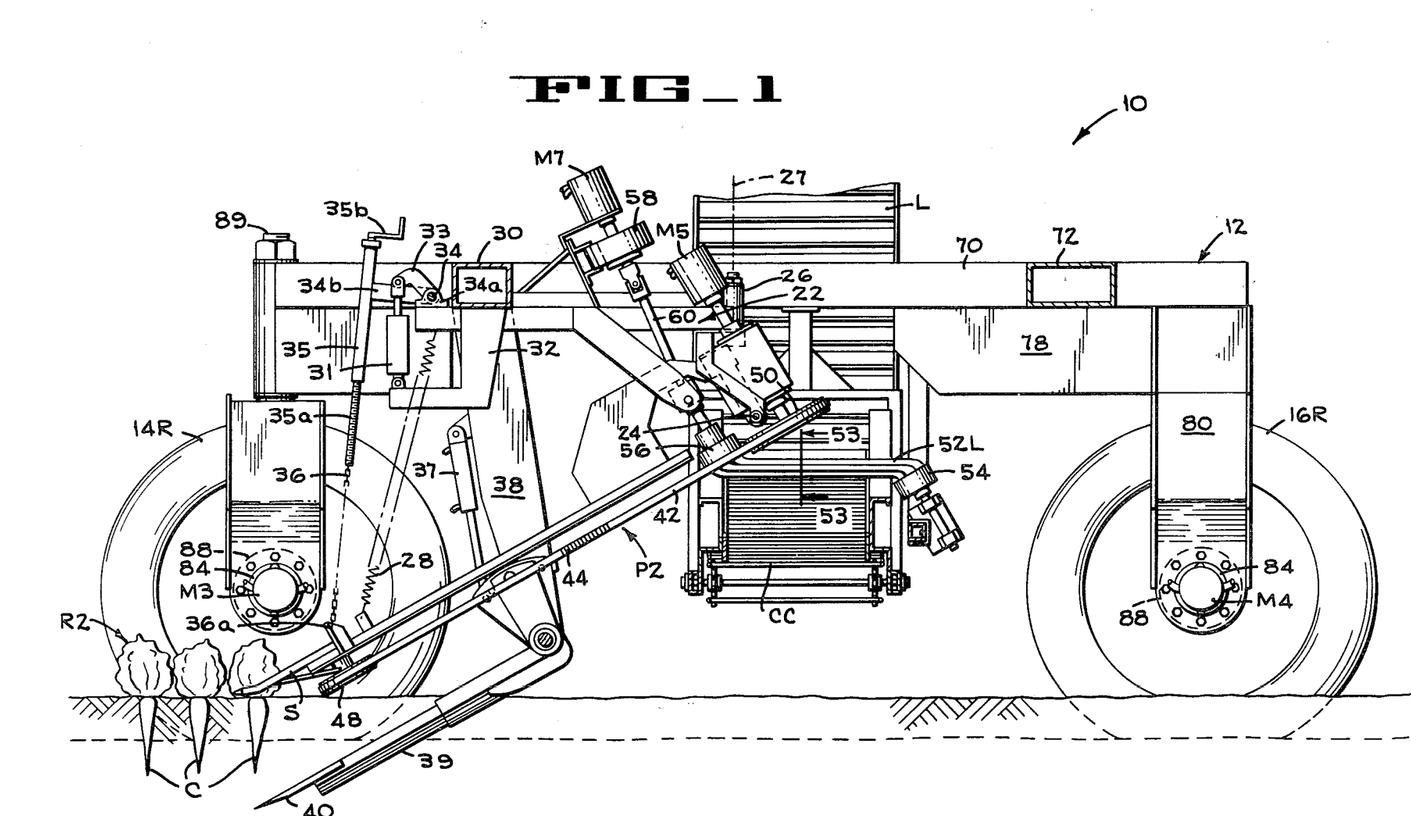
FIG. 1 is a schematic longitudinal section through a self-propelled four wheel drive root crop harvesting machine which incorporates the improved hydraulic drive system of the present invention.
Figure 2:
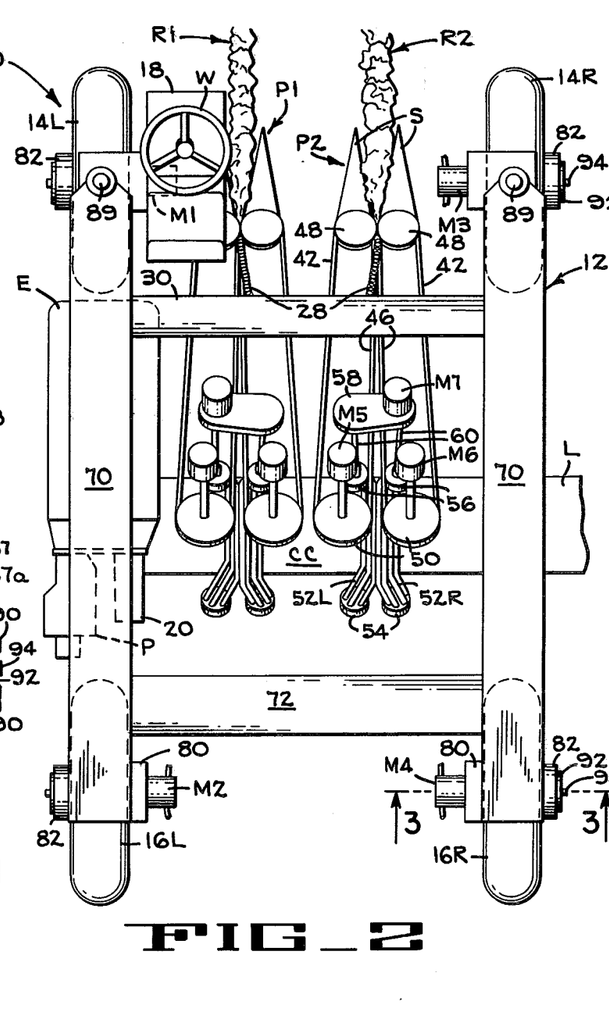
FIG. 2 is a schematic plan view of the harvesting machine shown in FIG. 1.

With reference to FIGS. 1 and 2, the root crop harvesting machine or vehicle 10 schematically depicted therein farms the subject matter of our copending patent application Ser. No. 790,355 filed on Apr. 25, 1977, (SJ 7857-O), the claims of which are primarily directed to improvements in the apparatus employed for harvesting carrots and for removing and separating the tops from the carrot roots.

With general reference to FIGS. 1 and 2, the harvesting machine 10 has an elevated frame 12 which is supported by a pair of steerable front left and right wheels 14L and 14R, respectively, and by a pair of rear left and right wheels 16L and 16R.

An operator's platform 18 (FIG. 2) is located adjacent the front left wheel, and dual picking heads P1 and P2 are located below the operator, and between the front wheels. Each wheel incorporates an individual hydraulic motor M1 and M2 for the left side front and rear wheels 14L and 16L, respectively, and M3 and M4 for the opposite side front and rear wheels 14R and 16R, respectively. A diesel engine E (FIG. 2) is slung under the frame 12 and powers a main hydraulic pump P for the wheel motors, and auxiliary pumps 20 for various other hydraulically powered operating structures, the details of which are not critical to the present invention.

The dual picking heads P1 and P2 are suspended from an overhead bracket 22 (FIG. 1) for vertical pivotal movement about a horizontal pivot 24 and for lateral swinging movement about a vertical pivot 26 having a vertical axis 27. At their leading ends, the picking heads P1 and P2 are provided with pairs of skids S, which in operation floatingly engage the ground surface at each side of planting rows R1 and R2. The floating engagement results from suspending the leading end portion of each picking head by a tension spring 28 connected between the head and a lateral tube 30 of the main frame 12.

For road travel, both picking heads, as shown for the picking head P2 in FIG. 1, are simultaneously lifted about the horizontal pivot axis 24 by a hydraulic lift cylinder 31 which is pivotally connected at one end to a bracket 32 depending from the lateral tube 30 and at the other end to an arm 33 secured to a cross shaft 34. The cross shaft 34 is rotatably mounted in bearings 34a (only one being shown in FIG. 1) mounted on the forward end of the overhead bracket 22. A pair of arms 34b (only one being shown) are secured to the shaft 34 on either side of the arm 33. To these arms are secured internally threaded tubular sleeves 35 which have threaded rods 35a mounted within them. A crank arm 35b is mounted to the upper end of the rod 35a and a chain 36 is mounted to the lower end. The chain 36 is connected at its opposite end to the picker head at 36a. The crank 35b is used to make fine adjustments in the height of the picker head relative to the ground.

A hydraulic lift cylinder 37 is pivotally connected at one end to a fixed plow bracket 38 and at the other end to a plow arm 39. The plow bracket 38 supports forwardly directed plow arm 39 for each picking head (only one being shown) to the leading end of which is affixed a plow or cutting blade 40.

In operation, the cutting edge of the blade 40 is buried in the planting row and loosens and lifts the soil and carrots C so that the carrot tops may be grasped by the picking head to free the entire plant and transport it upward and rearward.

The picking head P2, which is similar in construction to picking head P1, comprises a pair of rubber-like belts 42 having flat, ribbed outer surfaces 44 (FIG. 1) and closely spaced or contacting inner reaches 46 (FIG. 2) which grip the carrot tops. Each belt is trained around a lower idler sheave 48 and around an upper drive sheave 50. The two drive sheaves 50 are individually driven by hydraulic motors M5 and M6. Not shown are resiliently biased idler wheels which bear outward against the inner belt reaches 46 so that the carrot tops there-between are firmly gripped by the two belt reaches 46 for positive conveyance to a set of roller bars 52L and 52R.

The construction of the picking heads P1 and P2, and their associated roller bar sets 52L and 52R is similar to that disclosed in the U.S. Pat. to Urschel No. 2,331,520, issued Oct. 12, 1943, and the operation of the picking heads and roller bars generally follows known principles, excepting the specific improvements disclosed in our above identified copending patent application. The present invention is directed to the hydraulic drive system, and any type of picking head or agricultural implement may be employed. In the embodiment disclosed the picking head belts deliver and transfer the carrots to the roller bars, and the roller bars accomplish the following three operations. (1) The roller bars convey the carrots rearward over a hydraulically powered cross conveyor CC. (2) The roller bars pull the top of each carrot upward, while the bars react downward against the butt end of the carrot, to thereby pull or snap off the tops. (3) The roller bars deliver the tops rearward to fall on the ground while the carrots drop onto the cross conveyor CC and are discharged onto an elevator L. Roller bars of the type described are shown generally in the U.S. Pat. Nos. to Urshel Re 20,151, Oct. 27, 1936, Urschel 2,026,761, Jan. 7, 1936 and in other patents.

To achieve the above functions, a set of roller bars comprises, as viewed in the direction of the arrows 53,53 on FIG. 1, an elliptical array of left hand bars 52L, (FIG. 2) which move in a counterclockwise orbit, and an elliptical array of right hand bars 52R (FIG. 2) which travel clockwise. The left and right sets of roller bars are in different phase relation, so that a single bar from one set of bars meshes between two bars of the other set where they grasp the carrot tops. In order to mount and drive the roller bars, each bar is provided with a rear end portion which is bent down and socketed in an idler hub 54, and a front end portion which is bent up (parallel to the other end portion) and socketed in a driving hub 56. Both bent end portions of each bar lie in a common vertical plane, and the axes of the idler and drive hubs 54 and 56 are parallel. Thus, when the driving hubs 56 are rotated, the linear, central portions of the roller bars travel in an elliptical orbit as aforesaid, and the two sets of bars remove the tops from the carrots in the manner described.

For timing and powering the roller bar driving hubs 56, a gear box 58 is driven by a hydraulic motor M7 and is provided with two output shafts 60, each shaft being connected to a driving hub 56 and provided with universal coupling joints.

After dropping to the cross conveyor C, the carrots are delivered thereby to the elevator L, the upper end of which (not shown) overlies an attendant truck which collects the carrots for delivery to the packing shed for washing, sorting and the other usual preparations for market.

THE HYDRAULIC DRIVE SYSTEM

Figures 3, 4:
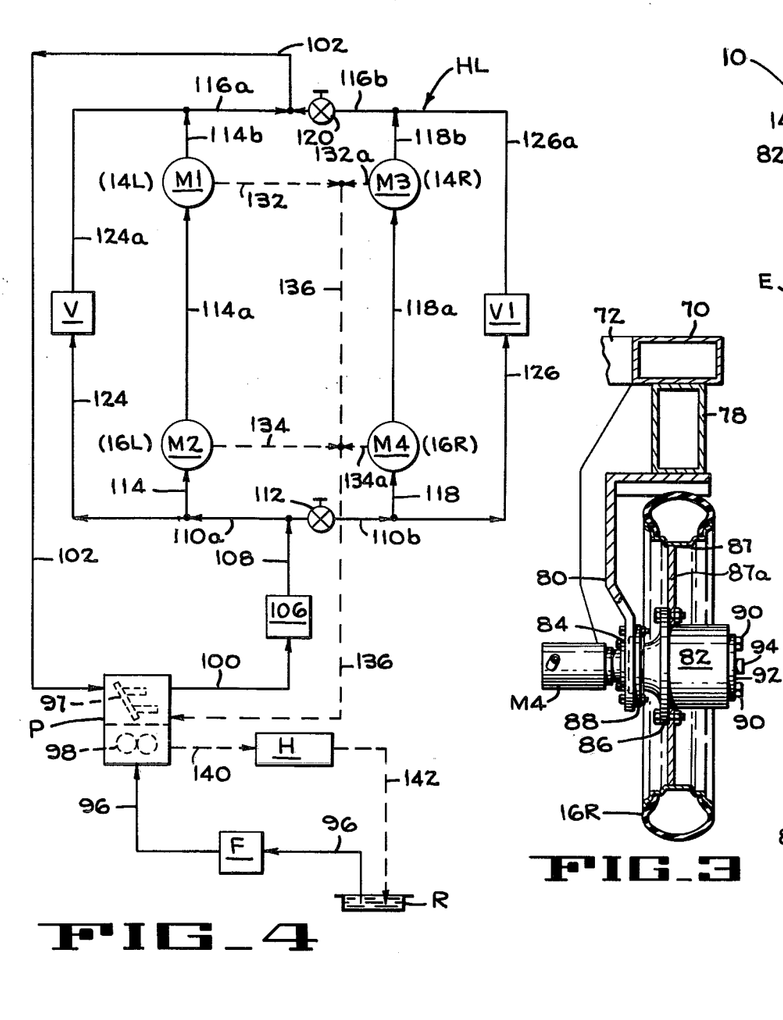
FIG. 3 is a vertical section through a rear wheel, taken substantially along the line 3—3 on FIG. 2.
FIG. 4 is a schematic diagram of the hydraulic circuit of the drive system.

Before describing the details of the hydraulic drive circuit shown in FIG. 4, it will be noted that the circuit depicts the principles of interconnecting and controlling the wheel motors, wherein (1) the motors for the two wheels at each side of the vehicle are in series connection, and (2) the pairs of series-connected motors at each side are in parallel connection across the pump.

With specific reference to the hydraulic drive system of the present invention, the frame 12 includes two laterally spaced longitudinal frame tubes 70 interconnected by the front cross tube 30 and a rear cross tube 72. The rear wheels 16L and 16R are rigidly connected to frame reinforcing tubes 78 under the rear portions of the longitudinal frame tubes 70, as shown in FIG. 3 for the right rear wheel 16R. A fabricated wheel support leg or strut 80 is welded to the tubes 70 and 78 and supports the hydraulically operated wheel motor M4 which is coupled by a bolt flange 84 to a planetary transmission or gear hub unit 82.

In the embodiment under description, the gear hub unit 82 is a commercially available unit such as the Torque Hub, manufactured by the Fairfield Manufacturing Company, Inc., of Lafayette, Indiana, and is sold in a wide variety of sizes. The gear hub 82 demountably carries the wheel 16R on a wheel mounting flange 86 which is provided with an offset rim 87 so that the track of the vehicle may be altered for certain planting row spacings by reversing the wheels.

The gear hub unit 82 is bolted to the lower end portion of the wheel strut 80 by a mounting flange 88. The structural arrangement of the strut 80, the hydraulic motor, and the gear hub unit 82 is typical of all wheels, except that the front wheels 14L and 16L are steerable about upright pivot shafts 89 which are incorporated in their strut mounting. The steering linkage between the front wheels and the steering wheel W (FIG. 2) is not critical to the invention and is not shown.

One operating feature of the gear hub unit 82 is that the output shaft, 95 of the drive motor M4 may be mechanically uncoupled or declutched from the hub unit 82 so that the wheel 16R can rotate freely. This feature is present on all four wheels. In some hydraulic drive vehicles this feature may be used to prepare the vehicle for towing, to prevent the motor from acting as a pump in the hydraulic circuit. An additional function in the present case is that the motor M4 is manually uncoupled from the rear right wheel 16R, and a similar uncoupling is effected for the motor M3 and the front right wheel 14R, in order to condition the vehicle for road travel under the propulsion power of only the wheels 14L and 16L on the left hand side of the vehicle. The uncoupling action is carried out manually, by merely removing two bolts 90 (FIG. 3) which hold a hub plate 92 to the outer end of the gear hub unit 82. An axially projecting lug 94 is integrally formed on the hub plate 92. The hub plate is then reinstalled with the lug 94 projecting inwardly into the gear hub. In this position, the lug 94 shifts and relocates an internal, splined axial shaft in the hub, which, thus relocated, disengages the shaft from a splined input gear. Since the hydraulic motor M4 is splined to the other end of the same shaft, the motor is thereby mechanically disconnected from and cannot turn, or be turned, by the wheel 16R. As mentioned, each wheel of the vehicle incorporates a gear hub unit 82 with the same coupling and uncoupling feature. The aforesaid Fairfield Torque Hub is one example of a unit having the features just described.

Figure 5:
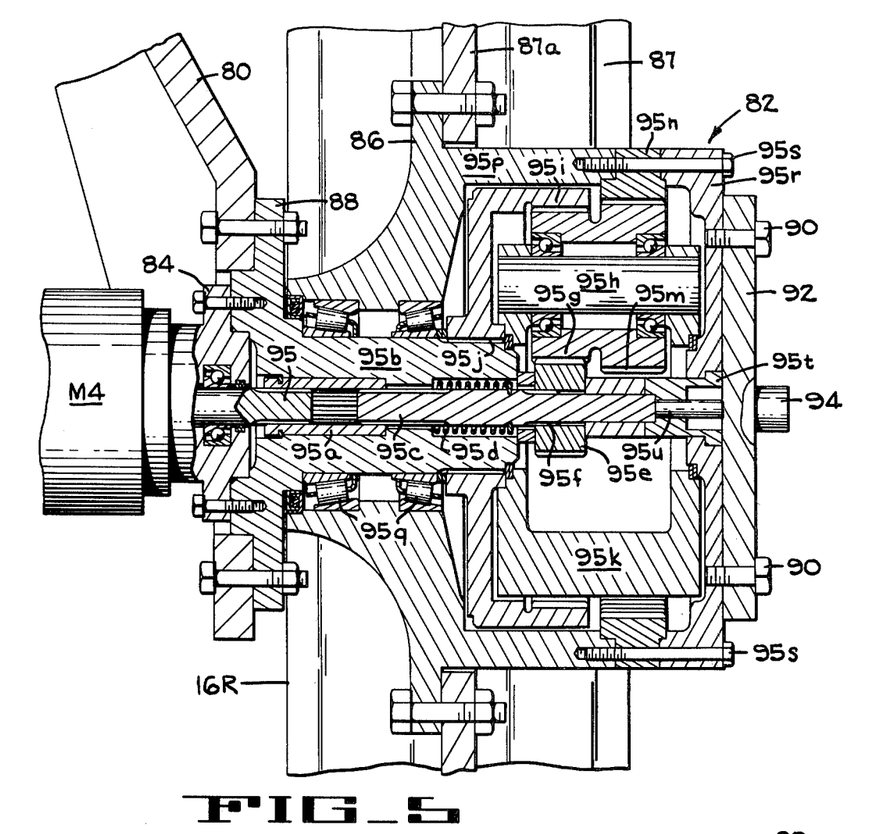
FIG. 5 is an enlarged sectional view to a Fairfield Torque Hub in its drive position.
Figure 6:
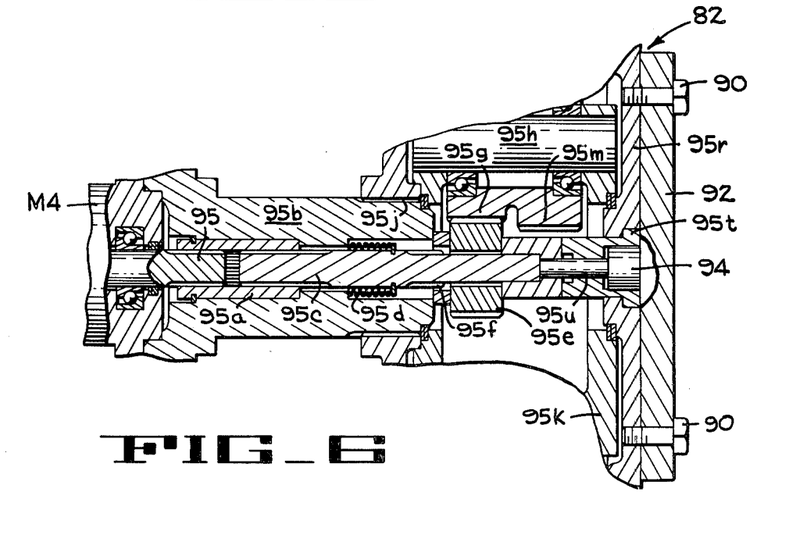
FIG. 6 is a partial sectional view showing the torque hub in its declutched or idle position.

The internal construction of a Fairfield Torque Hub, taken from their catalog, is shown in FIGS. 5 and 6, The hub includes a planetary gear reduction, the details of which are not part of the present invention, but which will be described briefly to present a clear understanding of the operation of the manually operated clutch claimed herein.

In FIG. 5, the hub plate 92 is positioned so that the hub clutch is in its wheel driving condition. The wheel strut 80 is bolted to the body flange 88 and with the wheel body 87a of the wheel rim 87 bolted to the wheel mounting flange 86. The hydraulic motor M4 is also shown bolted to the motor mounting flange 88.

The end of the motor shaft 95 is splined to an internally splined sleeve coupling 95a which is held by a retaining ring in a hub sleeve 95b integral with the mounting flange 88. The coupling 95a is slidably splined to the inner end of an input shaft 95c which is spring urged to the right in FIGS. 5 and 6 by a spring 95d that is compressed between a shoulder on the hub 95b and a spring retainer on the input shaft 95c.

The torque hub includes an internal planetary gear reduction unit having an input or sun gear 95e slidably splined on the outer end of the input shaft 95c at 95f. The input gear 95e meshes with the smaller planet gear 95g of a double planet gear that is rotatably mounted on a shaft 95h. The smaller gear 95g meshes with an internal gear 95i which is splined to the hub 95b at 95j and the shaft 95h is mounted in a carrier 95k rotatably mounted within the unit.

Integral with the smaller planet gear 95g is a larger planet gear 95m which meshes with a ring gear 95n that is secured to a wheel hub sleeve 95p. The wheel hub sleeve 95p is integral with the wheel mounting flange 86 and is rotatably supported by the stationary hub 95b by means of bearings 95q. A ring gear clamp and cover plate 95r bolts the ring gear 95h to the wheel hub sleeve 95p by means of bolts 95s. A thrust bearing 95t is fitted into the cover plate 95r and slidably receives a clutch operating pin 95u.

In the drive position of FIG. 5, the reversible hub plate 92 is applied by means of bolts 90 so that the plug 94 projects outwardly as in FIG. 3 of the drawings. Under these conditions, the spring 95d forces the splined input shaft 95c to the right as shown in that figure and causes its outer end splines 95f to engage the splines on the input gear 95e. The motor shaft 95 now drives the planetary gear arrangement and rotates the wheel hub 86 and the wheel body 87a.

In order to disengage the clutch, the hub plate 92 is reversed, as shown in FIG. 6, whereupon the lug 94 forces the clutch operating pin 95u to the left and this in turn slides the splined input shaft 95c to the left. The splines 95f on the outer end of the input shaft are now disengaged from the internal splines of the input gear 95e and therefore, the planetary transmission assembly and the associated wheel hub 86 can rotate freely on the hub 95b on the bearings 95q. Thus, when the wheel body 87a is rotated by motion of the harvester along the ground, the input gear 95e merely idles and does not drive shaft 95 of motor m4 through the disengaged coupling sleeve 95a. In other words, when the clutch within the torque hub is disengaged in the position of FIG. 6, a wheel mounted to the wheel hub can idle freely.

FIG. 4 shows an exemplary hydraulic circuit which affords the previously explained improved traction and handling results, and is oriented as is FIG. 2, so that the front of the vehicle is at the top. The hydraulic motors M1, M2, M3 and M4 are parenthetically associated with their wheels 14L, 16L and 14R, 16R. The main hydraulic pump P (driven by the engine E in FIG. 2) is connected through a filter F to the reservoir R of hydraulic fluid by suction lines 96.

The hydraulic circuit of FIG. 4 is a closed loop system, including high pressure loop HL, connected across the main pump P. The reservoir R comprises part of the frame tubes 70, in order to eliminate the space requirements of a separate reservoir.

In the embodiment under description, the main hydraulic pump P is of the variable displacement axial piston, adjustable swash plate type in which the flow direction of pressurized hydraulic fluid through a closed circuit pressure loop HL may be reversed by remotely changing the angle of the swash plate indicated diagrammatically at 97. The pump also includes a charging pump 98, in accordance with conventional practice. For forward motion of the vehicle, pressurized fluid is directed through a conduit 100 and returned to the pump via a conduit 102. In reverse operation, the conduit 102 energizes the hydraulic wheel motors, and conduit 100 is the return line. In the present example, the hydraulic motors are manufactured by the Sundstrand Hydro-Transmission Division of the Sundstrand Corporation, in Ames, Iowa, and are designated as Series 21, fixed displacement motors. The pump P is of the same manufacture, and is listed as a Series 23, variable displacement pump.

Assuming that the hydraulic circuit is in the operating mode which provides four wheel drive forward motion of the vehicle, as indicated by the arrows in FIG. 4, the pressurized fluid flows from the pump P into the conduit 100, and through a special purpose filter 106 which will pass high pressure fluid in either direction (to accommodate reverse flow to move the vehicle in reverse) without purging contaminants from the filter element back into the system. The filter 106 is a conventional, commercially available item, such as the Reversible Flow Filter manufactured by Paul Monroe Hydraulics, Inc. of Burlingame, California.

The hydraulic motors M1 and M2 on the left side of the vehicle for driving the left wheels 14L and 16L are connected in series and are in parallel with a two-way relief valve V. Similarly, the hydraulic motors M3 and M4 on the right side of the vehicle are connected in series and are in parallel with a two-way relief valve V1. These valves each include two high pressure relief valves and a shuttle valve and suitable valves are also manufactured for use with the aforesaid Sunstrand hydraulic motors.

In four wheel drive operation, which is the normal modje of operation during harvesting, the two sets of motors on each side of the harvester that are connected in series are in turn connected in parallel across the pump and all four motors drive their respective wheels. When running the harvester down the highway, it is desired to increase the speed of the harvester, and hence a series connected set of motors on one side of the machine are closed off from the pump by valves and the wheels are declutched from their motors. Under these conditions, the pump delivers all of the hydraulic fluid through the series connected set of motors on the other side, thereby substantially doubling the speed of the harvester.

Returning to the circuit of FIG. 4, downstream of the filter 106, the fluid under pressure is conducted by a conduit 108 to a branch line 110a for the left side wheels motors M2,M1 and a branch line 110b for the right side wheel motors M4,M3. A manually operable valve 112 is inserted in the branch line 110b but in four wheel drive operation, the valve 112 remains open.

The branch line 110a delivers fluid to the motor M2 by a line 114. Fluid passing through the motor M2 is delivered by a line 114a to the motor M1 and fluid leaving the motor M1 is delivered by a line 114b to a branch line 116a connected to the return line 102 for the pump.

Similarly, and in order to drive the right hand wheel motors, fluid from the line 108 passes through the branch line 110b, which contains the valve 112 previously mentioned, and on to motor M4 through a line 118. Fluid passing through the motor M4 is delivered to the motor M3 through a line 118a and fluid leaving the motor M3 is delivered by a line 118b to a branch line 116b which contains another manual shutoff valve 120. The valve 120 is also open during four-wheel operation. Fluid from the branch line 116b also connects to the return line 102 leading back to the pump P. In the simplest form of the invention, the valves 112,120 are manually operated, although it is to be understood that they could be remotely controlled valves.

In order to limit pressure supplied to the wheel motors and prevent damage to the wheel motors or to the pump P if an abnormal pressure condition arises, the crossover type relief valves V and V1 are respectively connected in parallel with the series circuits 114–114b and 118–118b for the left and right side hydraulic motors M1,M2 and M3,M4, respectively. The relief valve V for motors M1,M2 is connected to line 124 that branches from the branch delivery line 110a for the motors M1,M2. The relief valve V is also connected by a line 124a to the branch return line 116a, which in forward drive delivers fluid from the motors M3,M1 back to the pump P via line 102. In forward drive fluid under pressure is delivered to the relief valve V through the line 124 but when operating within the pressure setting, the valve does not open to the return line 124a. In valves, such as the Sundstrand valve previously mentioned, the valves V and V1 include a charge pressure relief valve for directing low pressure oil through motor casings by connections not shown.

In reverse drive, fluid under pressure is delivered to the valve V through the line 124a.

Similarly, the relief valve V1 for the motors M3, M4 for the right side wheels receives fluid under pressure from the branch line 110b through a line 126 in forward operation and receives fluid under pressure from the branch line 116b through the line 126a in reverse operation. A leakage drain system for the motors is shown in dashed lines in FIG. 4. Lines 132,134 from the casings of the motors M1,M2 connect to a return line 136 which returns leakage (and circulation makeup) hydraulic fluid back to the casing of pump P. The casings of motors M3,M4 are similarly drained of leakage and circulation oil by lines 132a,134a leading to the return line 136. Relief valve and casing circulation and drain systems of the type described are known in the hydraulic drive art and are not critical to the present invention.

In addition to the Sundstrand type valve previously mentioned, a suitable type of pressure relief valve V and V1 which is adjustable to a working pressure of 5000 psi, is a Hydrostatic Transmission Valve of the crossover type manufactured by Fluid Controls, Inc. of Mentor, Ohio.

The casing of the pump P is drained by a line 140, the oil passing through heat exchanger H in order to cool the oil, on through line 142 to the reservoir R.

To summarize, the essential characteristics of the hydraulic drive circuit of the present invention are as follows:

The high pressure loop HL energizes the left side wheel motors M1 and M2 in series connection during forward operation from the pump P, line 100, filter 106, input line 108, branch line 110a, line 114, left motor M2, series line 114a, left motor M1, line 114b, branch line 116a and the return line 102 to the pump P.

With valves 112 and 120 open, the right hand wheel motors M3,M4 are driven from the input line 108, branch line 110b (through the open valve 112) line 118, motor M4, line 118a, motor M3, series line 118a, line 118b, branch line 116b (through the open valve 120) and the return line 102 to the pump P.

It will also be seen that the pair of series connected wheel motors M1 and M2 on the left side of the vehicle are in parallel connection with the series connected wheel motors M3 and M3 on the right side of the vehicle.

With the valves 112 and 120 (in branch lines 110b and 116b) in their open condition, and with equal traction for all four wheels 14L, 16L and 14R, 16R, if the front wheels 14L and 14R are in straight-ahead steering position, the vehicle will have equal driving force at each side because of the equal flow and pressure drop across the motors. Under these conditions, one side of the vehicle will not advance faster than the other side.

The effect of traction loss of a wheel will now be explained. For example, with reference to the right side of the harvester, if one of the driving wheels on that side momentarily loses traction, such as when encountering a depression or a slick spot, its driving motor will not cause that wheel to accelerate, for reasons to be explained. Thus, when the wheel which had lost traction retains full traction, the wheel in question is turning at normal speed and the vehicle will not yaw, as it would if the slipping wheel had been previously accelerated during its loss of traction.

More specifically, assume that the right rear wheel 16R, driven by motor M4, loses traction. Since the same amount of fluid flows through both motors M4 and M3, the motor M4 will continue to operate at substantially the same speed as motor M3 because of the series connection of these motors via lines 118,118a and 118b. In other words, the flow volume of fluid through the two series-connected motors M3,M4 does not appreciably change, whether their wheels are in full tractive engagement with the ground or not.

Under the above conditions, where the wheel driven by the motor M4 loses traction, not only does that wheel maintain normal speed, as explained above, but the other wheel M3 on the same side (assuming that it has traction), can exert an increased torque on its wheel to compensate for the loss of traction of the other wheel on the same side of the harvester.

For example, with the series-connected motors on each side, assume again that the right wheel motor M4 has lost traction. This will reduce the pressure drop across the motor M4 in proportion to its loss of traction. The resultant decrease in pressure drop across the motor M4 makes available an increased pressure drop across its companion motor M3, and hence the latter is capable of applying increased torque to its wheel 14R. Of course, these principles apply regardless of which wheel on a side loses traction and they apply to the wheels on both sides.

This operation can be further explained considering a specific example. If the vehicle is in the four wheel drive mode and each wheel has the same traction, it can be assumed that each of the four motors provides 25% of the tractive effort because 25% of the total pressure drop occurs across each motor, with 50% of the total pressure drop taking place across the motors on one side and the other 50% across the motors on the other side. If the wheel of motor M4, for example, completely loses traction, the motor will continue to revolve at the same speed as that of motor M3, because of its series connection with the motor M3. However, the pressure drop across the motor M4 is reduced because it exerts little or no torque. For example, assume that the normal pressure drop across each motor is 1000 psi, giving a total pressure drop on one side of 2000 psi. Assume also that when the motor M4 loses traction its pressure drop falls from 1000 to 100 psi. This makes available a pressure drop of 1900 psi to the motor M3 (which has traction) and hence the motor M3 can exert additional torque on its wheel 14R to compensate for the loss of traction on the wheel 16R driven by the motor M4. Such results are attained because of the series-connection of the motors at each side of the vehicle, wherein loss of traction of one wheel on one side of the vehicle will simultaneously increase the tractive effort of the other wheel on the same side.

Since the pair of series connected motors at one side of the vehicle are in parallel connection with the pump, as is the pair of series connected motors at the other side of the vehicle, a differential action in four wheel drive is provided. With all four of the motors driving, the relative increase in fluid flow requirement for the two outside front and rear wheel motors and the correspondingly reduced fluid demand for the front and rear wheel motors on the inside of the turn radius is automatically supplied by the parallel connecting lines 110a, 110b and lines 116a, 116b to the motors of the wheels on the outside and the inside of the turn radius.

As to the previously described effects of traction loss at a wheel, the same operational conditions outlined above are true for reverse drive of the vehicle in four wheel drive. As long as one wheel on each side has traction, progress of the harvester will not be substantially reduced and even more important, the harvester will not yaw. the end result is that the loss of traction of one wheel on one or both sides does not adversely affect the steering control or motive power of the machine.

With the hydraulic components previously identified, a 13,500 pound machine can be propelled in a harvesting operation by all four drive motors at a ground speed of about 7 mph. For road travel between harvesting operations, this speed may be approximately doubled even though the engine E is operating at the same rpm as before. To condition the hydraulic circuit for road travel, the operator first manipulates a control, not shown, which shifts the internal swash plate 97 of the main pump P so that the pump provides zero output. Preferably, the engine E is stopped. Next, the manually operated valves 112 and 120 are closed to isolate the right side drive motors M3 and M4 so that they do not receive hydraulic fluid. At this time the hub plates 92 for the associated wheels 14R and 16R are reversed and reinstalled to de-clutch the wheels from their motors. Thus, the right wheels can turn freely without driving their motors M3 and M4 as pumps. When the engine is restarted and brought up to operating speed, and the swash plate 97 of the main pump P is restored to its drive position, the flow which formerly drove all four motors is routed through only the left side motors M1 and M2, and these motors thus run faster than in the four wheel drive mode, and in the example given will drive the wheels 14L and 16L at a speed of about 14 mph.

In road travel, the driving wheels 14L and 16L are almost always on the pavement, or at least on a relatively smooth surface, which will optimize the road traction. Since both driving wheels are on the same side of the machine with wheels on the opposite side running free, no differential between wheels on opposite sides is needed to negotiate even the sharpest turns. Meanwhile, the previously described advantages of the series-connected motors prevail; if one driven wheel on the driving side loses traction, such as by passing over an oil slick on a grade, the other motor proportionally compensates for the loss of tractive effort by the slipping wheel and there is no appreciable loss of net tractive effort.

The above described operation of the drive system of the present invention on the road can also be compared with a four wheel drive vehicle wherein the drive motors for the front wheels are connected in series, the rear wheel motors are connected in series and the front and rear pairs of wheel motors are in parallel connection across the pump. If a rear wheel (for example) on one side loses traction the pressure drop across its motor is correspondingly reduced. Simultaneously, the torque and hence the tractive effort of the opposite rear wheel is increased, resulting in wheel power steering of the vehicle.

In four wheel drive vehicles, wherein the wheel motors are individually connected in parallel with the pump for heavy going, and wherein the front wheels are disconnected from the pump for high speed road travel, if one rear wheel loses traction, its motor will accelerate and starve the supply of operating fluid to the other rear wheel motor. This will provide power wheel steering when the accelerated wheel regains traction, and will cause increased wear on the tire. If the slippage of one wheel continues and the opposite driven wheel maintains traction then it is possible that the opposite driving motor will stall, or approach a stall, in which case the vehicle is practically out of control unless individual brakes for the wheels are available. Even if the vehicle retains enough control to remain in place until the slipping wheel can be chocked, the only manner in which it can regain self-propulsion is by mechanically and hydraulically reconnecting the other two driving wheels. Also, if the two right side wheels are on the shoulder of the road, the shoulder wheels may slip if a heavy vehicle is on an upgrade. This will cause the shoulder wheels to accelerate and starve the laterally corresponding wheels that have traction so that they may not have a sufficient torque to move the vehicle. Of course, similar deficiencies are prevalent with parallel-connected hydraulic motors under harvesting conditions; the steering can be adversely affected, tire wear can be excessive, and the traction problems can result in an inordinate loss of time. The aforementioned problems are eliminated or greatly reduced in severity in the series drive system for the wheels on each side of the present invention.

Although the best mode contemplated for carrying out the present invention has been herein shown and described, it will be apparent that modification and variation may be made without departing from what is regarded to be the subject matter of the invention.

We claim:

1. In a self-propelled agricultural machine such as a harvesting machine or the like having four wheels, a hydraulic motor for driving each wheel, a drive system for the wheel motors comprising a power source, and hydraulic pump means driven by said source for driving said hydraulic wheel motors, hydraulic line means including delivery and return lines for connecting the two wheel motors on one side of the machine in series with said pump means, and hydraulic line means including delivery and return lines for connecting the two wheel motors on the other side of the machine in series with said pump means; the improvement for use of the machine on a roadway, wherein said hydraulic pump means comprises a single pump driven by said power source, the hydraulic line means for the series connected wheel motors for each side of the machine being respectively connected in parallel to said pump, a shut off valve in the delivery and return lines for the wheel motors on one side of the machine for causing all of the fluid delivered by said pump to flow in series through the wheel motors on the other side of the machine, and means for mechanically declutching the wheels from their motors on the valved side of the machine when said valves are shut off for preventing liquid circulation through the motors on said one side of the machine, thereby causing all liquid circulated by said single pump to flow through the series connected motors on the other side of the machine for substantially doubling the speed of the machine along the roadway with a given pump output.

* * * * *